(12) United States Patent  
Lopich et al.

(10) Patent No.: US 11,169,782 B2  
(45) Date of Patent: Nov. 9, 2021

(54) ARITHMETIC LOGIC UNIT, DATA PROCESSING SYSTEM, METHOD AND MODULE

(71) Applicant: Apical Limited, Cambridge (GB)

(72) Inventors: Alexey Lopich, Cambridge (GB); Viacheslav Chesnokov, Cambridge (GB)

(73) Assignee: Apical Limited, Cambridge (GB)

( * ) Notice: Subject to any disclaimer, the term of this patent is extended or adjusted under 35 U.S.C. 154(b) by 77 days.

(21) Appl. No.: 16/540,547

(22) Filed: Aug. 14, 2019

(65) Prior Publication Data  
US 2020/0089474 A1 Mar. 19, 2020

(30) Foreign Application Priority Data  
Sep. 17, 2018 (GB) .................................. 1815141

(51) Int. Cl.  
*G06F 7/57* (2006.01)  
*G06F 7/544* (2006.01)  
*G06F 7/556* (2006.01)  
*G06F 7/523* (2006.01)  
*G06F 7/483* (2006.01)

(52) U.S. Cl.  
CPC .............. *G06F 7/57* (2013.01); *G06F 7/4833* (2013.01); *G06F 7/5235* (2013.01); *G06F 7/5443* (2013.01); *G06F 7/556* (2013.01)

(58) Field of Classification Search  
CPC ...... G06F 7/4833; G06F 7/5235; G06F 7/556; G06F 2101/10  
See application file for complete search history.

(56) References Cited

U.S. PATENT DOCUMENTS 4,720,809 A * 1/1988 Taylor .................... G06F 7/483  
341/50  
4,727,508 A * 2/1988 Williams .............. G06F 7/4833  
708/517

FOREIGN PATENT DOCUMENTS

CN 107220025 A 9/2017

OTHER PUBLICATIONS

Dr. Ouiem Bchir, "Latches, Flip-Flops, and Registers", CS220 Computer Organization lecture notes, King Saud University, 2015, retrieved from https://csc220.files.wordpress.com/2015/01/ch_71.pdf (Year: 2015).*

D. Miyashita, E. H. Lee and B. Murmann, "Convolutional neural networks using logarithmic data representation," arXiv:1603.01025, Mar. 2016 (Year: 2016).*

V. Stojanovic and V. G. Oklobdžija, "Comparative analysis of master-slave latches and flip-flops for high-performance and low-power systems", IEEE J. Solid-State Circuits, vol. 34, pp. 536-548, Apr. 1999 (Year: 1999).*

(Continued)

*Primary Examiner* — Matthew D Sandifer  
(74) *Attorney, Agent, or Firm* — EIP US LLP

(57) ABSTRACT

An arithmetic logic unit, comprising an addition unit for determining a sum of a first input and a second input; and a logarithmic addition unit for determining an output using the sum and a third input. The output is a multiply-accumulate output represented in a logarithmic domain when the first, second and third inputs are represented in the logarithmic domain.

8 Claims, 5 Drawing Sheets

(56) References Cited

OTHER PUBLICATIONS

Gautschi et al. "An Extended Shared Logarithmic Unit for Nonlinear Function Kernel Acceleration in a 65-nm CMOS Multicore Cluster" IEEE Journal of Solid-State Circuits, vol. 52, Jan. 1, 2017, pp. 98-112.
Parhami, B., "Computer Arithmetic: Algorithms and Hardware Designs", Oxford University Press, 2010, pp. 366-367 and 384-387 and note figure 18.8.
Combined Search and Examination Report dated Mar. 18, 2019 for United Kingdom Application No. GB 1815141.5.

* cited by examiner

ARITHMETIC LOGIC UNIT, DATA PROCESSING SYSTEM, METHOD AND MODULE

CROSS-REFERENCE TO RELATED APPLICATIONS

This application claims the benefit under 35 U.S.C. § 119(a) and 37 CFR § 1.55 to United Kingdom patent application no. GB1815141.5, filed on Sep. 17, 2018, the entire content of which is incorporated herein by reference.

BACKGROUND OF THE INVENTION

Field of the Invention

The present invention relates to an arithmetic logic unit, data processing module, system, and method. More particularly the arithmetic logic unit, data processing module, system, and method operate in the logarithmic domain, where inputs and outputs are in a logarithmic domain.

Description of the Related Technology

A number of functions and processes undertaken by modern computing devices often require the implementation of functions within the hardware of the device. The demand for increased speed and processing power in ever smaller devices means there is a desire to reduce the area each of these functions requires. In particular with the advent of neural networks, neural network accelerators are becoming more common. Neural network accelerators typically contain a number of arithmetic logic units ('ALU') each typically containing at least one multiplier accumulator ('MAC') unit. A typical MAC unit 100 is shown in FIG. 1. The MAC unit 100 is arranged to receive a plurality of inputs 110a, 110b, 110c so as to perform a multiply-accumulate operation:

$$d = a*b + c \quad \text{(equation 1)}$$

The MAC unit 100 comprises a multiplication portion 120, and an addition portion 130. If the MAC unit 100 was configured to receive 16-bit inputs 110a, 110b, 110c, the multiplication portion 120 would comprise fifteen 16-bit adders, and the addition portion 130 would comprise one 32-bit adder. As result, one MAC unit 100 requires a relatively large area within the ALU. Accordingly, it is desirable to reduce the area required by each MAC unit 100 so that a greater number of MAC units 100 may be incorporated within a single ALU, and therefore increase the processing power and speed of a particular device.

SUMMARY

According to a first aspect of the present invention, there is provided an arithmetic logic unit, comprising: an addition unit for determining a sum of a first input and a second input; and logarithmic addition unit for determining an output using the sum and a third input, wherein the output is a multiply-accumulate output represented in a logarithmic domain when the first, second and third inputs are represented in the logarithmic domain.

According to a second aspect of the present invention, there is provided a data processing system comprising a processor; a neural network accelerator comprising one or more arithmetic logic units; and storage, wherein the arithmetic logic units are configured to perform a data processing operation in a logarithmic domain.

According to a third aspect of the present invention, there is provided a data processing module for generating an output, the module comprising; a maximum detection unit, for determining a maximum value between a first input and a second input; a difference unit, for determining a difference between the first input and the second input; and a fractional separation unit for determining an integer portion and a fractional portion of the difference, wherein the output is represented in a logarithmic domain when the first input and second inputs are represented in the logarithmic domain.

According to a fourth aspect of the present invention, there is provided a data processing method, the method comprising the steps of receiving a first input and a second input; determining a maximum value between the first and second inputs; determining a difference between the first and second inputs; determining an integer portion and a fractional portion of the difference; calculating an inverse of the fractional portion; shifting the inverse by the integer portion to produce a shifted value; adding the shifted value and maximum value to produce an output for use by a data processor, wherein the output is represented in a logarithmic domain when the first input and second inputs are represented in the logarithmic domain.

BRIEF DESCRIPTION OF THE DRAWINGS

Further features will become apparent from the following description, given by way of example only, which is made with reference to the accompanying drawings, in which like reference numerals are used to denote like features.

DETAILED DESCRIPTION OF CERTAIN INVENTIVE EMBODIMENTS

Details of methods, systems, modules and arithmetic logic units according to examples will become apparent from the following description, with reference to the Figures. In this description for the purpose of explanation, numerous specific details of certain examples are set forth. Reference in the specification to 'an example' or similar language means that a particular feature, structure or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 2:
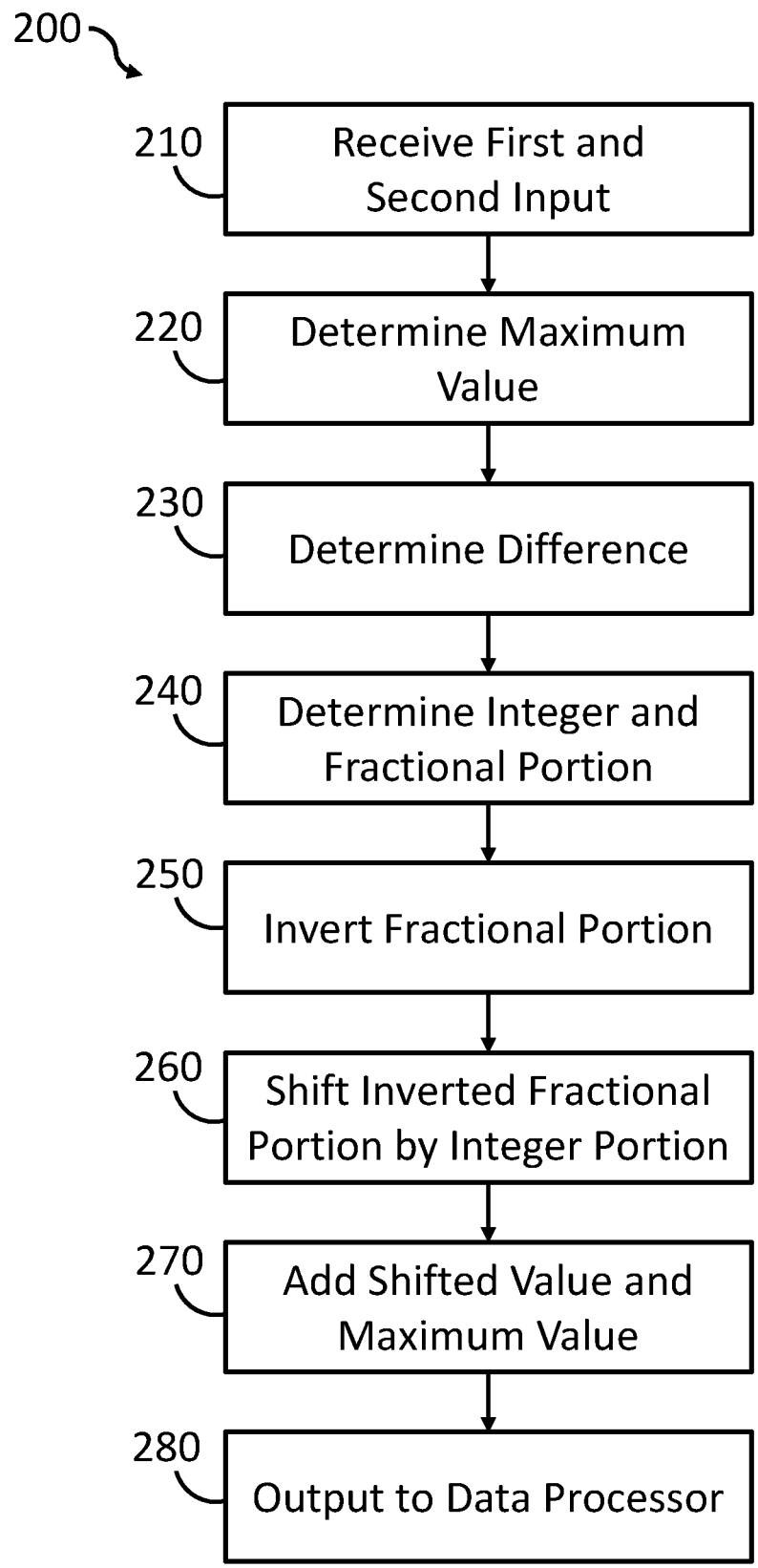
FIG. 2 is a flow diagram showing a data processing method according to examples.

FIG. 2 is a flow diagram showing a data processing method 200 according to examples. The data processing method 200 may be implemented as part of a multiplier-accumulator (MAC) unit, such as the MAC unit of FIG. 3 (described below).

At item 210 of the data processing method 200, a first and second input are received. The first and second inputs are bit values represented in the logarithmic domain. That is, a first input, such as the input 110a shown in FIG. 1 may be represented as:

$$A = \log_2(a) \quad \text{(equation 2)}$$

Figure 1:
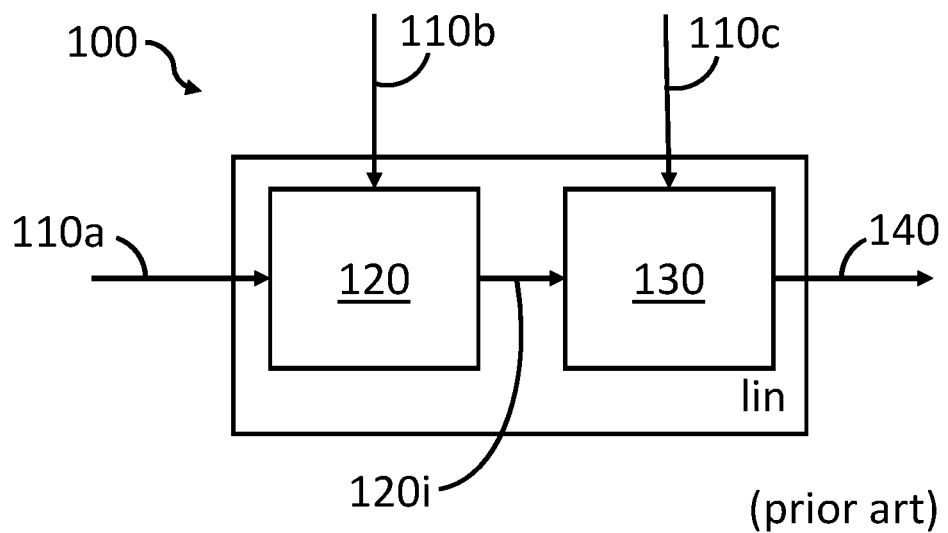
FIG. 1 shows schematically, a known, multiplier-accumulator unit.

Similarly, a second input, such as the input 110b shown in FIG. 1, may be represented as:

$$B = \log_2(b) \quad \text{(equation 3)}$$

In some embodiments, it will be appreciated that one or more of the inputs may be the result of earlier processing, for example, one of the inputs may be the sum of two other inputs to a processing device or system.

Upon receipt of the two inputs a maximum of the two inputs is determined at step 220, such that:

$$M = \max(A, B) \quad \text{(equation 4)}$$

Furthermore, at step 230 the difference between the first and second inputs is also determined. In some embodiments, at step 230, an absolute value of the difference is calculated. It will be appreciated that depending on the inputs to the method, the difference calculated may be less than zero, in this case an absolute value of the difference may be obtained. Such that:

$$S = |A - B| \quad \text{(equation 5)}$$

At step 240, an integer and fractional portion of the difference calculated at step 230 is determined. In some embodiments, this is determined by rounding the result of the difference from step 230 down to the nearest whole value, and subtracting the rounded result from the difference calculated at step 230 to determine the fraction portion. That is:

$$I = \lfloor S \rfloor \quad \text{(equation 6)}$$

$$F = S - I \quad \text{(equation 7)}$$

At step 250, the fractional portion of the difference is inverted. That is when operating in a binary base, the inversion step at 250 acts as a logic NOT. For example, where the fraction portion equals 00110011, the inverted factional portion will equal 11001100. That is:

$$F' = \neg F \quad \text{(equation 8)}$$

The inverted fractional portion is then bit-shifted right by a number of bits equal to the integer portion of the difference at step 260. In binary this is represented by a bit-shift right however when operating in base 10 (i.e. decimal) this is representative of a division by two to the power of the integer portion. That is in binary:

$$E = \neg F \gg I \quad \text{(equation 9)}$$

Or in decimal:

$$E = \frac{\neg F}{2^I} \quad \text{(equation 10)}$$

At step 270, the shifted value calculated at step 260 and the maximum value calculated at step 220 are added together and outputted to a data processor at step 280. That is:

$$D = M + E \quad \text{(equation 11)}$$

In summary, whilst each of the steps 210 to 280 of the method 200 are represented using mathematical equations, each of the equations 2 through 11 may be implemented in hardware, for example through the use of logic gates, such as AND, OR, NOR, XOR, and NOT so as to undertake an addition in the logarithmic domain, such that:

$$D = \max(A, B) + (\neg(|A - B| - \lfloor |A - B| \rfloor) \gg \lfloor |A - B| \rfloor) \quad \text{(equation 12)}$$

Figure 3:
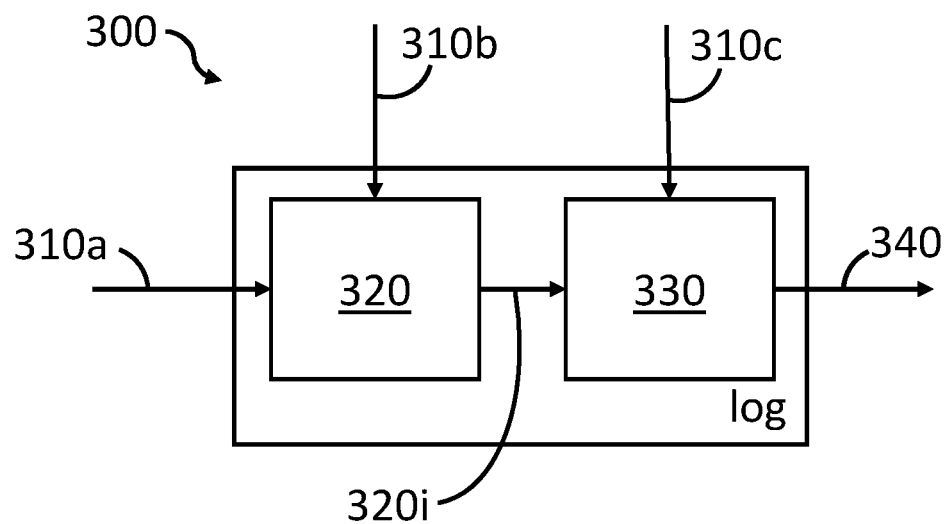
FIG. 3 shows schematically a multiplier-accumulator unit according to examples.

FIG. 3 shows schematically a MAC unit 300 for use in the logarithmic domain. The MAC unit 300 receives three inputs 310a, 310b, 310c each represented in the logarithmic domain, such as A, and B of equations 2 and 3 described above. The MAC unit 300 comprises a first module 320, and a second module 330. The first module 320 is an addition module for determining the multiplication between the first input 310a and the second input 310b. As the MAC unit operates in the logarithmic domain:

$$\log(a \times b) = \log(a) + \log(b) \quad \text{(equation 13)}$$

Therefore, operating in the logarithmic domain removes the requirement for a multiplication portion, such as the multiplication portion 120 of FIG. 1. In the case of 16-bit input values being used, the fifteen 16-bit adders mentioned above in relation to FIG. 1 are no longer required, However, as the MAC unit 300 operates in the logarithmic domain, the addition portion 130 of the MAC unit 100 of FIG. 1 may no longer provide an accurate output value 140 as it is designed to perform an addition function in the linear domain. Accordingly, a logarithmic addition module 330 is required. The logarithmic addition module 330 may calculate an output 340 following the method described above in relation to FIG. 2. The logarithmic addition module 330 receives an intermediary output 320i from the first module 320, and a third input 310c, also represented in the logarithmic domain. This may result in an output 340 represented in the logarithmic domain which has a maximal relative error of 6% when compared to a corresponding output 140 in the linear domain using the MAC unit 100 of FIG. 1, thereby ensuring an accurate result whilst reducing cost and power consumption, and allowing a processing device to contain a larger number of MAC units 300 in the same area.

Figure 4:
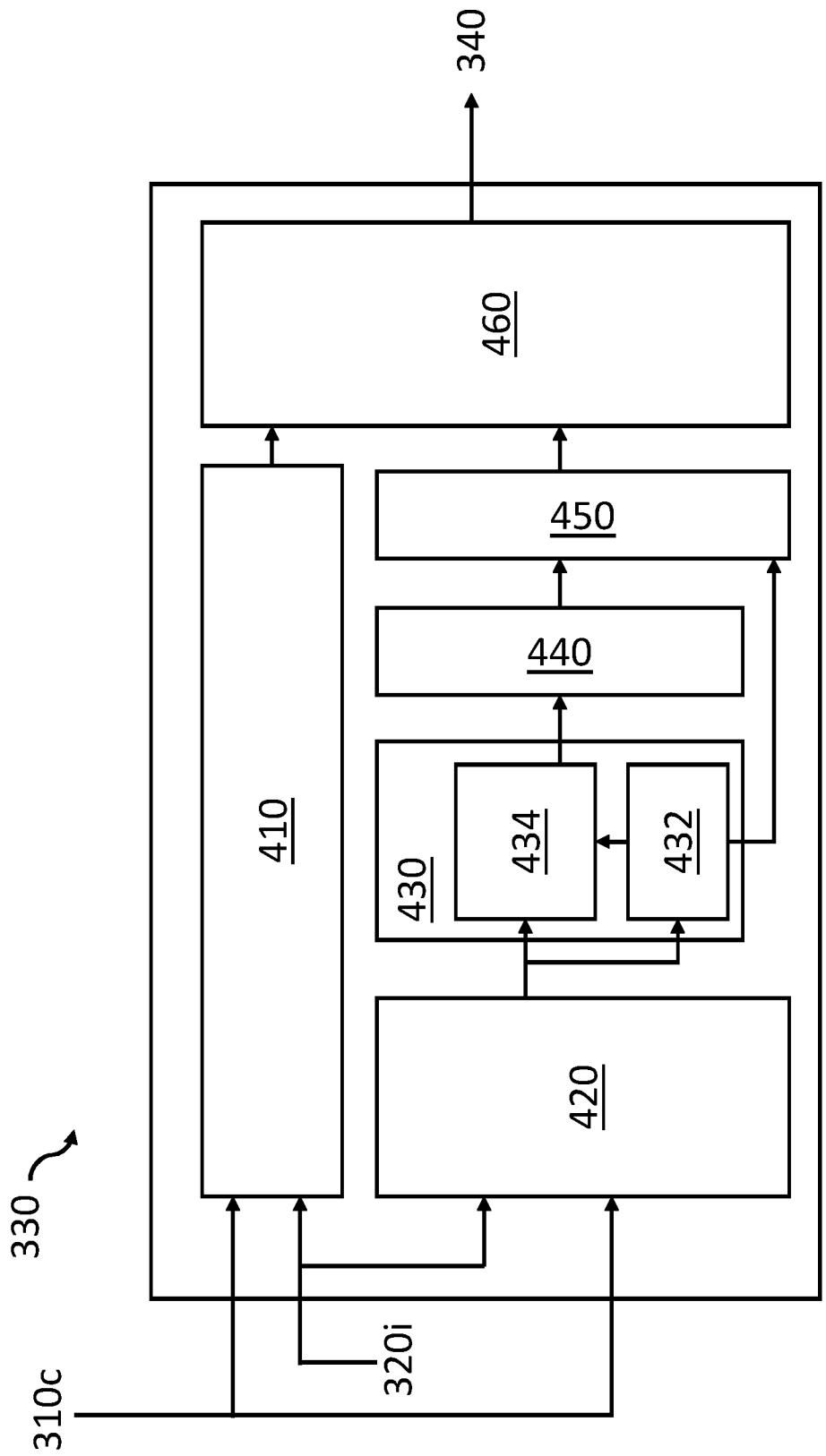
FIG. 4 shows schematically internal components of a logarithmic addition module of the multiplier-accumulator unit of FIG. 3, according to examples.

In one embodiment, the logarithmic addition module 330 may be implemented in hardware, such as the in FIG. 4. FIG. 4 shows schematically an example of the internal components of the logarithmic addition module 330 of the MAC unit 300 of FIG. 3. It will be appreciated that other methods and modules may be used to achieve a similar output based on a multiply-accumulate function in the logarithmic domain, with varying degrees of error when compared to a substantially equivalent multiply-accumulate function in the linear domain.

As mentioned above, the logarithmic addition module 330 may receive a third input 310c and the intermediary output 320i of the first module 320 of a MAC unit 300 of FIG. 3. The third input 310c and the intermediary output 320i may be represented in the logarithmic domain. The logarithmic addition module 330 contains a plurality of units 410-460 for performing a logarithmic addition according to the method 200 of FIG. 2 described above.

The third input 310c and the intermediary output 320i may be provided to a maximum detection unit 410. The maximum detection unit 410 comprises hardware, for example logic gates such as AND, OR, NOR, XOR, and NOT, for determining the maximum of the third input 310c and the intermediary output 320i.

The third input 310c and the intermediary output 320i may also be provided to a difference unit 420 capable of determining the difference between the third input 310c and the intermediary output 320i. The difference unit 420 may comprise logic gates and/or other components for first subtracting the intermediary output 320i from the third input 310c, to calculate the difference. The difference unit 420 may also comprise logic gates and/or other components for determining the modulus of a particular input, and/or determining which of the third input 310c and intermediary output 320i is larger. For example, where the intermediary output 320i is greater than the third input 310c, this is then output to a fractional separation unit 430. In other examples where the third input 310c is greater than the intermediary output 320i, the values maybe reversed such that the difference unit 420 subtracts the intermediary output 320i from the third input 320c, or alternatively perform the same subtraction as above (i.e. subtract the third input 320c from the intermediary output 320i) and then calculate an absolute value of the result using the logic for determining the modulus. In either example, the result is the same and is provided to the fractional separation unit 430.

The fraction separation unit 430 produces an integer portion and a fractional portion from the output of the difference unit 420. The fractional separation unit 430 may comprise an integer determination unit 432 and a fractional determination unit 434 for producing the integer portion and fractional portion respectively. Both the integer 432 and fractional 434 determination units comprise logic gates and/or other components for producing the integer and fractional portions.

The integer determination unit 432 comprises logic gates and/or components for rounding the input value, the input value being the output of the difference unit 420, down to the nearest integer. That is the integer determination unit 432 applies the equivalent of a floor function to the output of the difference unit 420.

The fractional determination unit 434 comprises logic capable of determining the difference between the output of the difference unit 420 and the output of the integer determination unit 432. This is achieved by subtracting the output of the integer determination unit 432 and the difference unit 420.

The output of the fractional determination unit 434 is then provided to an inversion unit 440. The inversion unit 440 comprises a logic not gate for inverting the output of the fractional determination unit 434. For example, where the output of the fractional determination unit 434 is 01110110 the output of the inversion unit 440 will be 10001001.

The output of the inversion unit 440 is then provided to a shifting unit 450, along with the output of the integer determination unit 432 of the fractional determination unit 430. The shifting unit 450 comprises logic gates and/or other components such as registers for performing a bit-shift right, wherein the output of the inversion unit 440 is shifted right by a number of bits representing the output of the integer determination unit. Continuing the example above where the output of the inversion unit 440 is 10001001, if the output of the integer determination unit 432 was four (4), then the output of the shifting unit 450 will be 00001000, wherein 10001001 has been shifted right 4 bits.

The output of the shifting unit 450 is then provided to an addition unit 460 along with the maximum value of the third input 310c and intermediary output 320i, outputted by the maximum detection unit 410. The addition unit 460 comprises logic gates and/or other components to determine the output of the maximum detection unit 410 and the shifting unit 450. The output 340 of the addition unit 460 may then be provided for use in a data processor, or other component such as a neural network accelerator (as will be described below in relation to FIG. 6).

When used as part of a multiplier-accumulator, such as 300 of FIG. 3 operating in the logarithmic domain, the output 340 is at least an approximation of a logarithmic representation of the multiply-accumulate output 140 of a known multiplier-accumulator operating in the linear domain, such as MAC unit 100 of FIG. 1.

Figure 5:
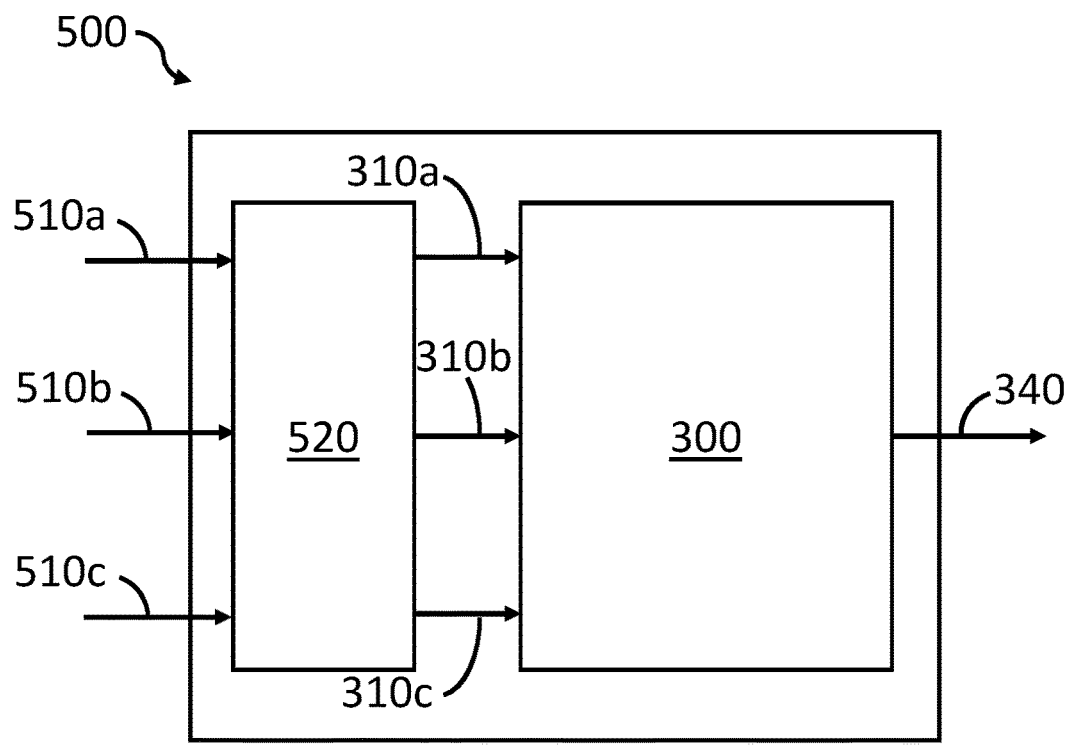
FIG. 5 shows schematically an arithmetic logic unit according to examples.

FIG. 5 shows schematically an arithmetic logic unit ('ALU') 500 according to examples. The ALU 500 may be configured to perform a data processing operation. In FIG. 5, the ALU (which is may be one of many ALUs in a system, such as system 700 as described below in relation to FIG. 7) includes a MAC unit 300, operating in the logarithmic domain as described above in relation to FIGS. 3 and 4. In other examples, an ALU for such a data processing system may include other components or may include a plurality of MAC units 100, 300, operating in both the logarithmic domain as described in relation to FIG. 3 and in the linear domain as described above in relation to FIG. 1. The data processing operation the MAC unit 300 of FIG. 5 is configured to perform is a multiplication-addition operation in the logarithmic domain. This may be used to implement the classification phase of a machine learning system, in this example a neural network, as described below.

In examples described herein, an ALU 500 may include a register arranged to receive an output of the data processing operation, the register comprising a plurality of single-bit storage devices arranged to storage binary data of a predetermined data size. For example, where the ALU 500 comprises a MAC unit, such as the MAC unit 300 described above in relation to FIG. 3, which is configured to perform an addition operation using a first module 310, and a logarithmic addition operation (for example, in accordance with the method described in FIG. 2) using a second module 320, the data processing operation may be considered to be either the addition operation or the logarithmic addition operation. If the data processing operation is taken to be the addition operation, the register is arranged to receive an output of the addition operation. Conversely, if the data processing operation is taken to be the addition operation, the register is arranged to receive an output of the logarithmic addition operation.

In the example of FIG. 5, the inputs 510a, 510b, 510c to the ALU 500 may be retrieved from storage (not shown). The storage is for example external to the ALU 500 and may be a random-access memory (RAM) such as DDR-SDRAM (double data rate synchronous dynamic random access memory). In other examples, the storage may be or include a non-volatile memory such as Read Only Memory (ROM) or a solid-state drive (SSD) such as Flash memory. The storage in examples may include further storage devices, for example magnetic, optical or tape media, compact disc (CD), digital versatile disc (DVD) or other data storage media. The storage may be removable or non-removable from a computer device.

The inputs 510a, 510b, 510c may be stored in the linear domain, and therefore will be incompatible with the MAC unit 300. As such, the inputs 510a, 510b, 510c will need to be transformed into the logarithmic domain. Accordingly, the ALU 500 may also comprise a logarithmic conversion unit 520 for converting inputs 510a, 510b, 510c in the linear domain into the logarithmic domain so that they may be used as inputs 310a, 310b, 310a to the MAC unit 300 of the ALU 500. It will be appreciated that whilst the ALU 500 of FIG.

5 shows a single MAC unit 300 and a single logarithmic conversion unit 520, the ALU 500 may comprise a plurality of MAC units each connected to a single logarithmic conversion unit 520, or alternative a plurality of logarithmic conversion units 520 associated with a plurality of MAC units 300. The number of logarithmic conversion units 520 does not have to equal the number of MAC units 300.

In some examples, the ALU 500 may include a plurality of registers, each arranged to store data at various stages. For example, each of the inputs 510a, 510b, 510c may be transferred from storage one or more input registers. The input registers provide inputs (sometimes referred to as operands) to a data processing operation, such as a logarithmic conversion. The ALU 500, may also comprise a plurality of intermediary registers for receiving the logarithmic conversion outputs from the logarithmic conversion unit 520, and arranged to provide inputs to further data processing operations, in this example an addition operation implemented by a first module 310 of the MAC unit 300. The addition operation may be considered to be a first data processing operation, as in this example the ALU is capable of a plurality of data processing operations.

The output 340 of the MAC unit 300 may also be stored in one or more registers for use in further data processing operations. In some embodiments, the output 340 may also be/alternatively stored in storage, which may or may not be the same storage as the inputs 510a, 510b, 510c as described above.

Whilst it will be appreciated that the ALU 500 shown in FIG. 5 comprises a logarithmic conversion unit 320, a system and/or data processor comprising the ALU 500 may operate solely in the logarithmic domain and therefore not require such a logarithmic conversion unit 320. Alternatively, the logarithmic conversion unit 320 may be external to the ALU 500, for example the logarithmic conversion unit 320 may be part of a processor or neural network accelerator (as described below in relation to FIG. 6).

Due to the high-power consumption of neural networks, for example during the classification of an image, or other data, the processing of neural networks, may be performed using a neural network accelerator 600 which is dedicated to this process. Internal components of the neural network accelerator 600 are shown schematically in FIG. 6.

The neural network accelerator 600 includes a plurality of ALUs 500a, 500b, 500c. Components of one of the ALUs 500a is shown in more detail in FIG. 5, described above. The ALUs 500a, 500b, 500c are each arranged to perform a multiply-accumulate operation as described above, which may for example be used to perform the convolutions required for a neural network.

The neural network accelerator 600 includes an interface 630, via which inputs to a neural network may be received, for example from other components of a computer device (such as the computer device described below in relation to FIG. 7). For example, a CPU may include software configured to determine the at least one parameter relating to a data processing operation arranged to be implemented by an ALU, such as one of the ALUs 500a, 500b, 500c of the neural network accelerator 600. The ALU typically includes at least one MAC unit 300 (generally an array of MAC units), although other ALUs are possible. In general, an ALU 500 may be considered to be any electronic circuit that may perform arithmetic and bitwise operations on binary numbers. The at least one parameter may therefore be transferred to the neural network accelerator 600 via the interface 630.

In other examples, the at least one parameter may be determined by the neural network accelerator 600 itself, for example using hardware.

Other inputs which may be received by the neural network accelerator 600 via the interface 630 include image data representative of an image to be classified using the neural network and kernel data representative of a kernel associated with the neural network after training. For example, the neural network may be trained either by the computer device or by an external computer device or computer system, for example using a GPU. The output of the training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, as part of the convolution of the kernel with the image patch.

Figure 6:
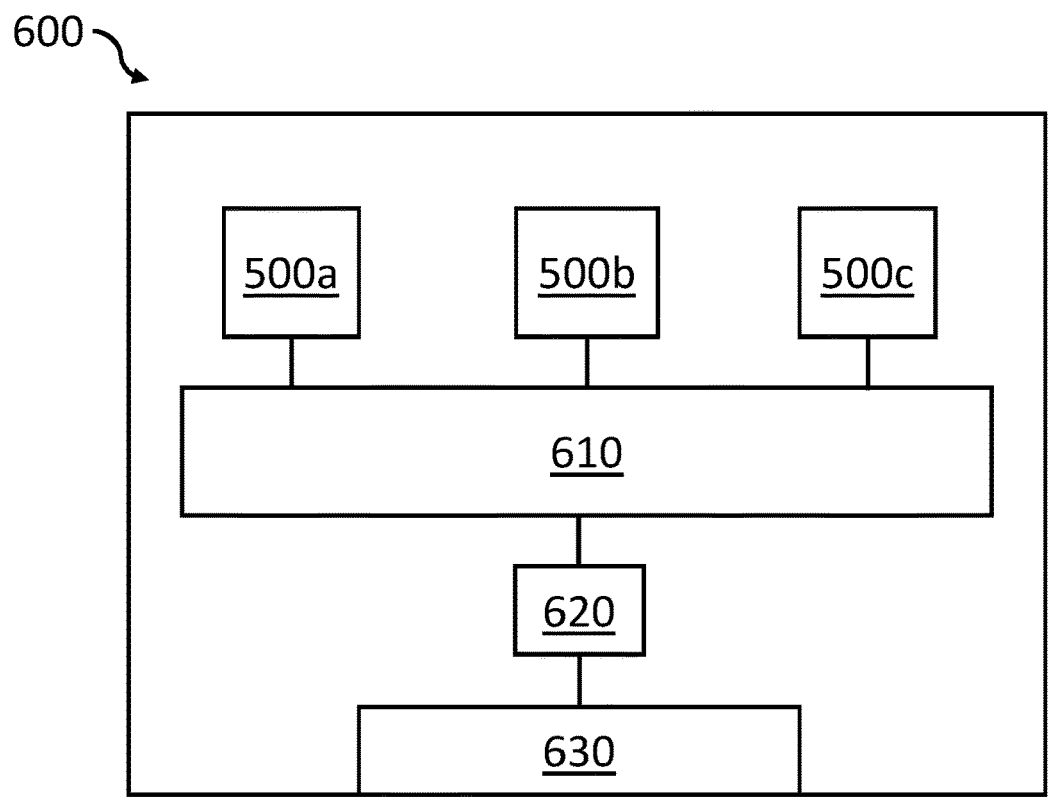
FIG. 6 shows schematically internal components of the neural network accelerator of FIG. 2.

The neural network accelerator 600 of FIG. 6 also includes a direct memory access (DMA) which allows the neural network accelerator 600 to access the storage directly, independently of a CPU. This may improve the speed at which the neural network accelerator 600 is able to perform classification of input data. For example, the neural network accelerator 600 may access inputs, to be input to the classification process, directly from the storage (which may be main memory or system memory), without having to wait for the CPU to be available using a direct memory access module 620. For example, the at least one parameter, the image data and the kernel data may be stored in the storage and retrieved from the storage by the neural network accelerator 600.

The neural network accelerator 600 includes static random-access memory (SRAM) 610, which may be used to store inputs to the classification process implemented by the ALUs 500a, 500b, 500c. For example, the SRAM may be on-chip or local memory of the neural network accelerator 600, which is generally quicker to access than the storage. The SRAM may include a plurality of separate storage areas. For example, the image data may be stored in a different storage area from the kernel data (although, in some cases, they may be stored in the same storage area).

Figure 7:
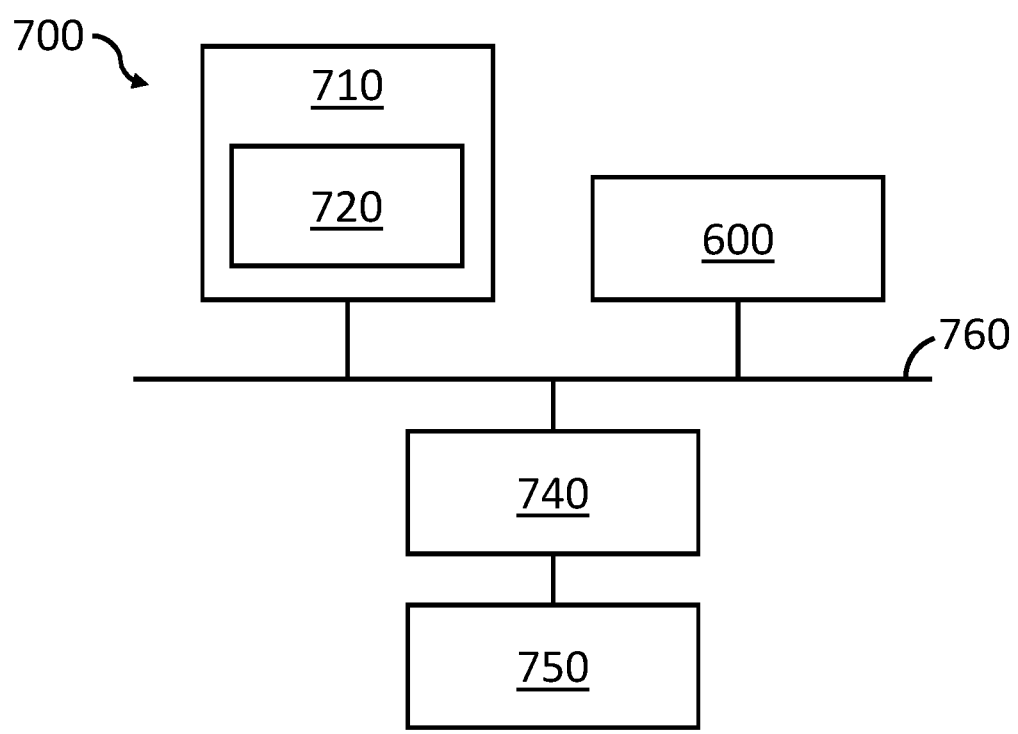
FIG. 7 shows schematically a computer device for use with a data processing method according to examples.

An example of a computer device 700 for use with the data processing method according to examples, such as the method of FIG. 2, is shown schematically in FIG. 7. The computer device 700 of FIG. 7 is a personal computer. However, in other examples, the methods described herein may be performed using other computer devices such as a smartphone, a laptop, a tablet or an on-board computer device which may be coupled to or mounted within a vehicle such as a car.

The computer device 700 includes at least one processor. In this example, the computer device 700 includes a central processor unit (CPU) 710. The computer device 700 also includes a neural network accelerator 600, which is a processor dedicated to implementing at least classification of data using a neural network. In other examples, though, the computer device 700 may include other or alternative processors such as a microprocessor, a general purpose processor, an image signal processor (ISP), a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computer device 700 may also or alternatively include a processor implemented as a combination of computing devices, e.g., a combination of a DSP and a microprocessor, a plurality of microprocessors, one or more microprocessors in conjunction with a DSP core, or any other such configuration. The computer device may also or alternatively include at least one graphics processing unit (GPU).

The CPU 710 of FIG. 7 includes a driver 720 which for example provides an interface between software configured to control or configure the neural network and the neural network accelerator 600, which is configured to perform the processing to implement the neural network. In other examples, though, a neural network may be implemented using a more general processor, such as the CPU or a GPU.

The computer device 700 of FIG. 7 also includes a dynamic memory controller (DMC) 740 which may be used to control access to storage 750 of the computer device 700. The storage 750 is for example external to the neural network accelerator 600 and may be a random-access memory (RAM) such as DDR-SDRAM (double data rate synchronous dynamic random-access memory). In other examples, the storage 750 may be or include a non-volatile memory such as Read Only Memory (ROM) or a solid-state drive (SSD) such as Flash memory. The storage 750 in examples may include further storage devices, for example magnetic, optical or tape media, compact disc (CD), digital versatile disc (DVD) or other data storage media. The storage 750 may be removable or non-removable from the computer device 700.

The components of the computer device 700 in the example of FIG. 7 are interconnected using a systems bus 760. This allows data to be transferred between the various components. The bus 760 may be or include any suitable interface or bus. For example, an ARM® Advanced Microcontroller Bus Architecture (AMBA®) interface, such as the Advanced eXtensible Interface (AXI), may be used.

As explained above, the computer device 700 in the example of FIG. 7 may be arranged to implement the classification phase of a neural network.

The order of processing steps in the examples described above are merely examples. In other examples, these processing steps may be performed in a different order.

It is to be understood that any feature described in relation to any one example may be used alone, or in combination with other features descried, and may also be used in combination with one or more features of any other examples, or any combination of any other examples. Furthermore, equivalents and modifications not described above may also be employed without departing from the scope of the accompanying claims.

What is claimed is:

1. An arithmetic logic unit for generating an output in a logarithmic domain, comprising:
   an addition unit for determining a sum of a first logarithmic input and a second logarithmic input; and
   a logarithmic addition unit for determining the output using the sum and a third logarithmic input, the logarithmic addition unit comprising:
   a maximum detection unit, for determining a maximum value between the sum and the third logarithmic input;
   a difference unit, for determining a difference between the sum and the third logarithmic input;
   a fractional separation unit for determining an integer portion and a fractional portion of the difference,
   an inversion unit for determining an inverse of the fractional portion;
   a shifting unit for shifting the inverse by the integer portion to produce a shifted value; and
   an addition unit for determining the output, wherein the output is a sum of the shifted value and the maximum value.

2. The arithmetic logic unit of claim 1, comprising a logarithmic conversion unit, for converting data from a linear domain into the logarithmic domain to generate at least one of the first logarithmic input and second logarithmic input.

3. The arithmetic logic unit of claim 1, comprising one or more registers arranged to receive the output, the one or more registers comprising a plurality of single-bit storage devices.

4. The arithmetic logic unit of claim 3, wherein the third logarithmic input is derived from the one or more registers.

5. The arithmetic logic unit of claim 1, the fractional separation unit comprises logic elements determining the integer portion and the fractional portion of the difference represented in the logarithmic domain.

6. A neural network accelerator comprising the arithmetic logic unit of claim 1.

7. The arithmetic logic unit of claim 1, wherein the difference unit of the logarithmic addition unit comprises a modulus unit for determining an absolute value of the difference.

8. The arithmetic logic unit of claim 1, wherein the fractional separation unit of the logarithmic addition unit comprises a rounding module for rounding the difference, and a second subtraction unit, for determining a second difference between the first difference and the rounded difference.

* * * * *